United States Patent
Chenchev et al.

(10) Patent No.: US 11,100,243 B2
(45) Date of Patent: Aug. 24, 2021

(54) SELECTIVE PERSISTENCE OF DATA UTILIZED BY SOFTWARE CONTAINERS

(71) Applicant: MICROSOFT TECHNOLOGY LICENSING, LLC, Redmond, WA (US)

(72) Inventors: Margarit Simeonov Chenchev, Sammamish, WA (US); Benjamin M. Schultz, Bellevue, WA (US); Giridhar Viswanathan, Redmond, WA (US); Balaji Balasubramanyan, Redmond, WA (US); Yanan Zhang, Bellevue, WA (US); Frederick Justus Smith, Redmond, WA (US); Hari R. Pulapaka, Redmond, WA (US); David Weston, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 520 days.

(21) Appl. No.: 15/871,635

(22) Filed: Jan. 15, 2018

(65) Prior Publication Data
US 2018/0349629 A1 Dec. 6, 2018

Related U.S. Application Data

(60) Provisional application No. 62/516,041, filed on Jun. 6, 2017.

(51) Int. Cl.
*G06F 21/56* (2013.01)
*G06F 21/62* (2013.01)

(52) U.S. Cl.
CPC ........ *G06F 21/6218* (2013.01); *G06F 21/566* (2013.01); *G06F 21/568* (2013.01); *G06F 2221/034* (2013.01)

(58) Field of Classification Search
CPC .. G06F 21/6218; G06F 21/568; G06F 21/566; G06F 2221/034
See application file for complete search history.

(56) References Cited

U.S. PATENT DOCUMENTS 9,256,467 B1 * 2/2016 Singh ................... G06F 9/5055
2010/0122343 A1 * 5/2010 Ghosh ................... G06F 21/53
726/23

(Continued)

*Primary Examiner* — Samson B Lemma
*Assistant Examiner* — Abdullah Almamun
(74) *Attorney, Agent, or Firm* — Newport IP, LLC; David W. Foster

(57) ABSTRACT

Technologies are described for selective persistence of data utilized by software containers. A configuration policy is defined that includes data that specifies one or more data stores for which data is not to be persisted following accesses to a software container and one or more data stores for which data is to be persisted following accesses to the software container. When the software container is first accessed, the data stores identified in the configuration policy are attached to the software container. Upon a subsequent access to the container, such as at the conclusion of a user session or upon destruction of the container, the data in the attached data stores is persisted or deleted based upon the configuration policy. When the software container is once again accessed, the data store containing the persisted data can be re-attached to the software container.

20 Claims, 5 Drawing Sheets

(56) References Cited

U.S. PATENT DOCUMENTS

| | | | |
|---|---|---|---|
| 2017/0177877 A1* | 6/2017 | Suarez | G06F 16/2455 |
| 2018/0196680 A1* | 7/2018 | Wang | G06F 16/184 |
| 2018/0218149 A1* | 8/2018 | Jacobs | G06F 21/52 |
| 2018/0278613 A1* | 9/2018 | Ganda | G06F 21/602 |
| 2018/0278639 A1* | 9/2018 | Bernstein | G06F 21/577 |
| 2018/0307537 A1* | 10/2018 | Chen | G06F 9/45504 |
| 2018/0349610 A1* | 12/2018 | Gupta | G06F 21/57 |

* cited by examiner

SELECTIVE PERSISTENCE OF DATA UTILIZED BY SOFTWARE CONTAINERS

CROSS-REFERENCE TO RELATED APPLICATIONS

This application claims the benefit of U.S. Provisional Patent Application No. 62/516,041, entitled "CONTAINER PERSISTENCE," which was filed on Jun. 6, 2017, and which is expressly incorporated herein by reference in its entirety.

BACKGROUND

The security of computing systems is more important now than ever before. One mechanism for securing computing systems involves using spatial isolation techniques, sometimes referred to as "sandboxing," to limit the ingress or egress of data from a computing system. For instance, a software container (which might also be referred to herein as a "container") might be created that is completely isolated from the computing system that hosts it (the "host computer" or "host").

One use for sandboxing techniques such as those described above is to isolate data processed by a web browser application, or another type of application, from a host computer. For instance, a container can be instantiated for executing a web browser application to isolate data processed by the web browser, such as data received from web sites, from the host computer upon which it executes. Because the container is isolated from the host, data accessed through the web browser cannot access important data stored on the host computer. When a user is done using the web browser, the container can be destroyed. Similar techniques can be used to isolate other types of applications from a host computer.

Instantiation and destruction of a container in the manner described above can, however, negatively impact the performance of the computer hosting the container. In particular, instantiation and destruction of a container in the manner described above can utilize significant computing resources, such as memory, processor cycles, power, and other types of computing resources.

Destruction of a container following use by a user will also result in the loss of any user data in the container. For instance, web browser preferences, such as favorites, browsing history, web cookies and homepage, will be lost following the destruction of a container. Other types of user data can also be lost in a similar fashion when a container is destroyed. This type of data loss can also cause technical and usability challenges.

It is with respect to these and other considerations that the disclosure made herein is presented.

SUMMARY

Technologies are described herein for selective persistence of data utilized by software containers. Through an implementation of the technologies disclosed herein, certain types of data associated with a software container, such as user data, can be persisted following a session with the software container or destruction of the software container. Other types of data, such as data that might include malicious or untrustworthy code, can be deleted when the session with the software container ends or the container is destroyed.

By selectively persisting data used by a software container in this manner, the need to repeatedly instantiate and destroy a software container can be reduced or eliminated. As a result, the use of computing resources, like processor cycles and memory, can be reduced. Additionally, computing system performance can be improved because user data is persisted and, therefore, does not need to be recreated during a subsequent use of a software container. Other technical benefits not specifically identified herein can also be realized through implementations of the disclosed technologies.

According to one implementation of the disclosed technologies, a configuration policy for a software container is defined. The configuration policy includes data that specifies one or more data stores for which data is not to be persisted following accesses to a software container. A data store might be a physical hard disk, a virtual hard disk, a networked data store, or another type of data store suitable for storing persistent or non-persistent data.

The configuration policy might, for example, specify that the data stored in a data store is not to be persisted, such as by destroying the data, following a user session with a software container. As another example, the configuration policy might specify that the data stored in a data store is not to be persisted following destruction of the software container. In this way, any data that might have been compromised during utilization of the container can be destroyed.

The configuration policy can also include data that specifies one or more data stores for which data is to be persisted following accesses to a software container. For instance, the configuration policy might specify that the data stored in a data store is to be persisted following a user session with a software container. As another example, the configuration policy might specify that the data stored in a data store is to be persisted following destruction of the software container. By persisting the data in a data store in this way, the data survives the end of the user session with a container or the destruction of a container and, therefore, can be attached to the container or another instance of the container at a future point in time.

When a software container is first accessed, such as at the time of instantiation or the beginning of a new user session with a container, the data stores identified in the configuration policy are attached to the software container. In this manner, the data stores that are to be persisted and the data stores that are not to be persisted are made available for use by the software container.

Upon a subsequent access to the container, such as at the conclusion of a user session or upon destruction of the container, the data in the attached data stores is persisted or deleted based upon the configuration policy. For instance, temporary data received from web sites during the user session with the container might be deleted. User data, such as a user's web browser preferences, can be persisted. Other types of data, such as system logs or other types of system data generated or utilized by the software container, can also be persisted. The data persisted on a single data store can be limited to data generated by a single application or include data generated by multiple applications. The applications can define the data that is to be persisted.

When the software container is once again accessed, such as at the beginning of a new user session or upon creation of a new instance of the software container, the data store containing the persisted data can be re-attached to the software container. Similarly, newly created empty temporary data stores for storing data that is not to be persisted can be attached to the software container as specified in the configuration policy. Multiple data stores for storing persisted and non-persisted data can be attached to a software container in a similar manner.

In order to associate a software container with a data store, data uniquely identifying the software container can be stored in the data store. Additionally, the configuration policy can also include data that defines an association between a software container and the data uniquely identifying the software container that is stored in the data store. This data can be utilized to identify the data stores that are to be attached to software containers.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description and illustrated in the FIGS. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description set forth below is described with reference to the accompanying FIGURES ("FIGS." or "FIG."). In the FIGS., the left-most digit(s) of a reference number generally identifies the FIG. in which the reference number first appears. The same reference numbers in different FIGS. can also be used to indicate similar or identical items. References made to individual items of a plurality of items can use a reference number with a letter or a sequence of letters to refer to each individual item. Generic references to the items may use the specific reference number without the sequence of letters. The FIGS. submitted herewith include.

DETAILED DESCRIPTION

Figure 1:
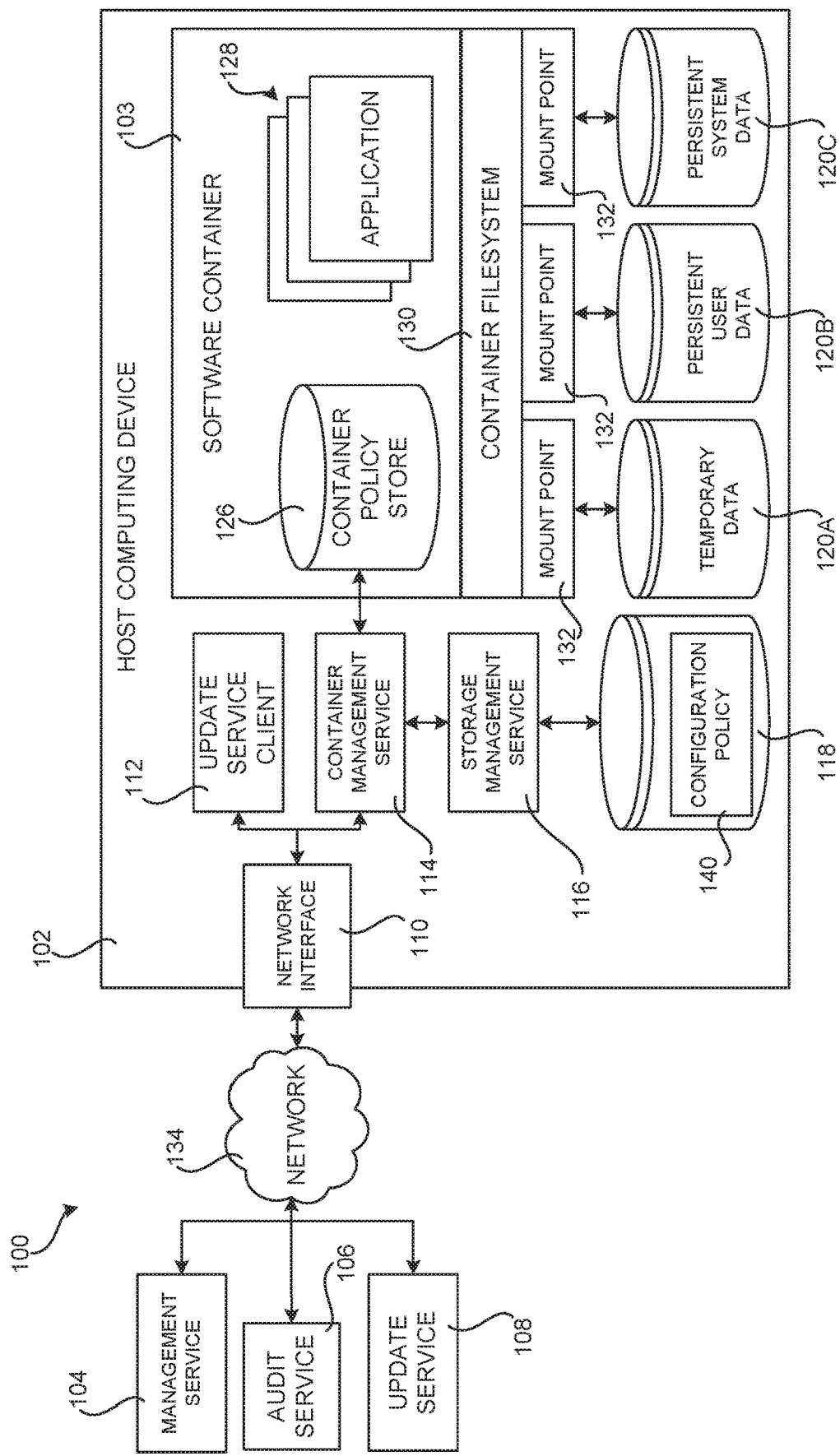
FIG. 1, which is a computing system architecture diagram, shows an overview of a system for selective persistence of data utilized by software containers, according to one particular configuration.

The following detailed description is directed to technologies for selective persistence of data utilized by software containers. As discussed in greater detail below, the technologies described herein can leverage software containers to host a workload and associated processes, while also providing functionality for persisting certain types of data for future access and use by the software container, while also avoiding potential data leaks and malicious content entering a secure computer system. As discussed briefly above, implementations of the technologies disclosed herein can reduce the utilization of processor cycles, memory, network bandwidth, and other computing resources. Other technical benefits can also be realized through an implementation of the technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for selective persistence of data utilized by software containers will be described.

FIG. 1, which is a computing system architecture diagram, shows an overview of a system 100 for selective persistence of data utilized by software containers, according to one particular configuration. As shown in FIG. 1, the system 100 includes a host computing device 102 (which might be referred to herein as a "host" or "host computer") that executes a software container 103. The host 102 might be a client device, such as a laptop or desktop computer. The host 102 might also be a server located in a data center or another type of computing device capable of executing a software container 103.

As discussed briefly above, the software container 103 provides an isolated execution environment on the host 102 that provides a runtime for applications 128. Some deployments will have more than one software container 103. For example, server environments might have hundreds or even thousands of containers 103. Software containers 103 executing on a single host computer 102 access a single operating system kernel and, as a result, containers 103 can be more efficient than virtual machines ("VMs"), which require separate operating system instances. Containers 103 hold the components necessary to run the desired applications 128, such as files, environment variables and libraries. The operating system executing on the host 102 constrains access to physical resources, such as processor cycles and memory, by the container 103 so a single container cannot consume all of the physical resources of the host 102.

The system 100 shown in FIG. 1 also includes a management service 104. The management service 104 is a network service that creates and distributes policy, such as the configuration policy 140 described below, to the hosts 102 and containers 103 in a given deployment. This management service 104 can implement the lightweight directory access protocol ("LDAP"), mobile device management ("MDM") service, or another mechanism for distributing policy to hosts 102 and containers 103.

The system 100 also includes an audit service 106. The audit service 106 is a network service for monitoring logs in a deployment, thereby enabling compliance assurance and investigations. The audit service 106 might, for example, retrieve and analyze log files generated by the software container 103 or components executing therein. The illustrative system 100 shown in FIG. 1 also includes an update service 108. The update service 108 is a network service that implements maintenance and servicing in a deployment, distributing software patches, updates and upgrades. Although not illustrated as such in FIG. 1, the management service 104, audit service 106, and update service 108 can be executed on server computers, or other types of computing devices, in the system 100.

The management service 104, audit service 106, and update service 108 communicate with hosts 102 and containers 103 over a network 134, such as the internet or a local area network ("LAN"), by way of a network interface 110. The network interface 110 is typically a Wi-Fi, Ethernet, or mobile broadband interface, and associated software for sending and receiving information from a network 134. Note that applications 128 executing in a container 103 might also use the network interface 110 to exchange information with network resources such as other servers, clients or devices not illustrated in FIG. 1. The host computing device might have more than one network interface 110.

As shown in FIG. 1, the host computing device 102 executes an update service client 112 in some configurations. The update service client 112 receives software updates from the update service 108, and deploys the software updates to the host 102 and, potentially, to the container 103. A container management service 114 also executes on the host 102 in some configurations. The container management service 114 controls the lifecycle of the container 103 (e.g. instantiate, configure, destroy). In some deployments, the container management service also creates an image for the container 103.

The container management service 114 can also connect to the management service 104 to receive policy updates, and updates the host policy store 118 on the host 103 and the container policy store 126 in the container. In some implementations, such as a within a datacenter, the container management service might be implemented as a third-party management service, such as the DOCKER container management service, which can call local operating system services to fulfill these duties end-to-end.

The storage management service 116 is a service that executes on the host computing device 102 that provides functionality for exposing data stores 120 to the software container 103. For example, and without limitation, when notified by the container management service 114, the storage management service 116 can create a storage system as specified in the configuration policy 140. In some embodiments, the storage management service 116 creates and mounts virtual hard disk ("VHDs") for use by the software container 103. In other embodiments, the storage management service 116 service attaches other types of data stores 120, such as a physical hard disk, a networked data store, or another type of data store 120 suitable for storing persistent or non-persistent data in the manner described herein. The storage management service 116 also provides data to the container management service 114 for use in maintaining a table of identifiers for tracking the relationships between the container 103 and the data stores 120. Additional details regarding this process will be provided below.

In the example shown in FIG, the storage management service 116 has attached three data stores 120A-120C to the software container 103 via mount points 132. The data store 120A is configured to temporarily store data and is not persisted following use of the software container 103. The data store 120B is configured to store user data persistently. The data store 120C is configured to store system data persistently. Although only a single temporary data store 120A and two persistent data stores 120B and 120C have been illustrated in FIG. 1, additional temporary and persistent data stores 120 can be used in other embodiments.

The software container 103 can access the data stores 120 through the container filesystem 130. The container filesystem 130 can be shared with the host 102 or implemented separately from the host 102. The mount points 132 can be to actual physical hard disks or other data stores, might represent an isolated directory in the container 103 or on the host 102, or it might be to a networked storage server such as a filesystem server or to a raw storage server.

The host policy store 118, mentioned briefly above, stores policies relating to the operation of the software container 103, including the configuration policy 140. The configuration policy 140 can include data defining the persistence policy associated with the software container 103. For instance, the configuration policy 140 can indicate the temporary and persistent data stores 120 that are to be attached to the software container. The host policy store 118 might also store other policies for the container, such as a policy identifying applications 128 that are permitted to be executed within the container 103.

The host policy store 118 can also store data identifying the container types on a host 102 and policies associated with the containers 103. These policies can be used when the container management service 114 constructs the container image for the container 103. In some implementations, the policies stored in the host policy store 118, including the configuration policy 140, contain information about storage locations, storage hardware, metadata about the data stores 120 such as associated applications, data access control lists ("ACLs"), and permissions. These policies might also specify application deployment and update information, user permission information and application data repair information for use in reset and recovery.

The container policy store 126 stores other container policies such as, but not limited to, a configuration for the container filesystem 130 or a configuration for the applications 128. These policies can define, for instance, applications 128 permitted to be executed on the container 103, storage locations for application, system, or user data (e.g. in a temporary or persistent data store 120), and other types of settings.

As discussed briefly above, data utilized by the software container 103 can be classified in different ways. For example, and without limitation, the data might be characterized as system data (e.g. an OS image, configuration data, auditing and event logs, telemetry data, a machine identifier ("ID"), etc.), user data (e.g. username, password, favorites, etc.), and application data (e.g. save state, credentials, user ID, browser cookies, etc.).

Once the data used by the container 103 has been classified in this way, a storage model can be implemented using the container filesystem 130 and the data stores 120 to ensure that each category of data is stored in an appropriate location. Some of these locations will persist (e.g. the data stores 120B and 120C in the example shown in FIG. 1), while other locations (e.g. the data store 120A in the example shown in FIG. 1) will be temporary and therefore deleted following a given access to the container 103 (e.g. following the conclusion of a user session with the container 103 or destruction of the container 103).

Different operating systems might structure data that is to be persisted and data that is not to be persisted differently. For example, in the MICROSOFT WINDOWS operating system, much of the data to be persisted is anchored with a user profile. As most applications and features are written to store their state in the user profile, aspects of the user profile can be preserved to get persistence. Other operating systems might anchor their data on other objects such as a machine ID. In at least one implementation disclosed herein, the machine ID is preserved to achieve persistence.

Sometimes, however, data will not be anchored to a set of objects or will not have an easily definable structure. Various techniques can be utilized to achieve persistence in these scenarios. For example, in one embodiment an application can implement an import/export feature to register the application's intent to persist data. This can provide both selective persistence and operating system notification. In another embodiment, the operating system executing on the host 102 supports additional layers of containerization to isolate application 128 from the container 103 runtime environment. This might include, for example, isolating the application's 128 system configuration (e.g. through a configuration file or registry) and isolating the data written by the application. This might also include isolating the data associated with one application 128 from data generated by another application 128.

In some configurations, users of the container 103 and/or the applications 128 will require persisted data to be encrypted. Encryption requirements and types may be part of the configuration policy, or might be locally calculated based on capabilities of the storage file system and/or the storage hardware.

In one example implementation, a plurality of server computers may be connected to clients across a network, such as the internet. The servers might be deployed as containers 103 distributed across one or more physical computing servers or devices. Thereafter, when a client accesses the internet or other shared resources, the client may receive data and content directly from trusted sources, e.g., via a white list of trusted sources of content.

If a client then decides to access data and content from an untrusted source, the source may be accessed through one or more of the containers 103 connected to the client. Accordingly, if malicious content, code segments, or other harmful content is accessed using the container 103, the container 103 may isolate this harmful content from the client. Thereafter, the container 103 may be refreshed, deleted, and/or restored absent the harmful content and more efficiently than a full VM instance. Additionally, the container 103 might not receive any enterprise or protected information from the client, thereby offering additional protection from malicious disclosure of proprietary information stored or accessed through the client computing device.

With regard to container persistence, it is to be understood that once the container 103 accesses malicious or harmful information, the container 103 can be recreated based on an image stored at a filesystem or storage system. Accordingly, while a portion of data associated with the malicious content can be deleted, different data can persist and therefore facilitate a cohesive user experience whereby certain data persists without compromising security, private information, and other sensitive data.

For example, the system 100 can create a storage model to persist certain data based on user preferences, enterprise security protocols, or other considerations. The persistent data can include user data that is not to be persisted and data that is to be persisted. Data may be chosen for persistence based on attributes, such as whether the data is user data, system data, or application data. Thereafter, when recreating a container 103, the data stores storing persistent data can be attached to the newly recreated container 103 such that a user can utilize the container 103 without the additional steps of applying user preferences, recreating user data, and reapplying settings that are persistent. The data persisted on a single data store can be limited to data generated by a single application or include data generated by multiple applications. The applications can define the data that is to be persisted.

In some embodiments in which container lifetimes are very short as compared to typical lifetimes, the data stores 120 may be pre-configured (e.g. pre-provisioned) and made available prior to container creation. In some implementations, additional storage instances (e.g. data stores 120) will be attached after container creation. This might be because additional capability is enabled, such as auditing or telemetry, or it might be because a new application is installed that requires persistence of certain data.

To ensure the container 103 has the appropriate access to the data in the persistent storage 120, the container management service 114 ensures that a given container 103 persists its machine ID. For example, in the MICROSOFT WINDOWS operating system this is the security identifier ("SID"). In the MICROSOFT WINDOWS operating system, this unique identifier (such as a SID) of the container 103 is fixed for a given user on a host 102 for the lifetime of that user account on that host 102 (that is, the container machine SID can be different for different users on the same or different hosts 102).

The machine SID can be set by the container management service 114 at image creation or inserted into the container image through other techniques. In addition, the user ID is fixed, so that even when the container 103 is updated, the user data saved by the earlier instances of the container 103 is accessible from the updated container 103. In some operating systems like the MICROSOFT WINDOWS Operating system, the user relative identifier ("RID") is also fixed in order to fix the user ID.

In some implementations, the container management service 114 creates a table of identifiers to track the relationship between the container 103 and the associated data stores 120. An example of the type of data that is in the table includes:

TABLE 1

Container type (optional);
Container administrative ID (optional);
Container ID;
User ID;
User metadata (e.g. username, credentials);
Storage identifier (e.g. hardware ID); and
Storage metadata.

In some embodiments, the configuration policy 140 can define the relationship between containers 103 and associated data stores 120. The configuration policy 140 can indicate whether data stores 120 are to be encrypted. Other embodiments might utilize the container management service 114 to dynamically calculate the relationship based on local host 102 capabilities such as available storage hardware, file system capabilities, operating system versions, and so forth.

Some operating systems enable users to persist credentials. To achieve this, the credentials are typically placed in encrypted storage. However, to access this credential information across operating system lifetimes, it should be ensured that the correct information is persisted and protected. Commonly, the decryption key is dynamically created by the user ID and the user credentials. To protect this, the user ID is fixed and thus stored in the container management service 114. Subsequently, the user credentials can also be stored on the host 102. To implement this, some operating systems such as the MICROSOFT WINDOWS operating system use technologies such as CREDVAULT and the Data Protection Application Programming Interface ("DPAPI").

It is to be appreciated that in some embodiments it is not necessary to persist data indefinitely. For instance, in some implementations data may be considered temporary and may be deleted based on requirements of the application 128 that generated it, the length of time the data has been present, pressure on disk footprint, data retention policies or other similar considerations. Some of the data may be stored by the container management service 114 in the table of identifiers described above as storage metadata. In some circumstances, a remote deletion may be required, for example if a device was lost or stolen. In this scenario, the container management service 114 can receive a policy update instructing it to immediately delete some or all the persistent data. In some circumstances, this remote deletion should not be made obvious. In this scenario, the container management service 114 will recreate the persistent storage elements (i.e. data stores 120 for storing persisted data) based on current policy settings.

Some multi-user deployments might allow for sharing of storage locations to achieve collaboration and data sharing. This functionality can be implemented by enabling multiple user IDs and credentials for the same storage ID. Typically, users share data using a specific given application 128, such as a word processor or notebook application. When data sharing is no longer needed, a new policy update may remove access. Data in this scenario will be managed as outlined above.

In view of the above, it is to be appreciated that the techniques disclosed herein offer multiple technical benefits, including but not limited to: the ability to control the lifetime of persistent data based on policies; the ability to control the subset of data that can be persisted instead of persisting the whole system data (e.g. persisting only user data or a subset of it such as favorites, credentials, browser cookies etc., and not persisting the system data changes; the ability to decide based on user actions or policies, sharing of persistent data across different container instances; and the ability to lock down the data coming from an untrusted container 103 to always open in that same instance of the untrusted container 103 such that it cannot be used to infect other containers 103. Other technical benefits can be realized through implementations of the disclosed technologies.

Figure 2:
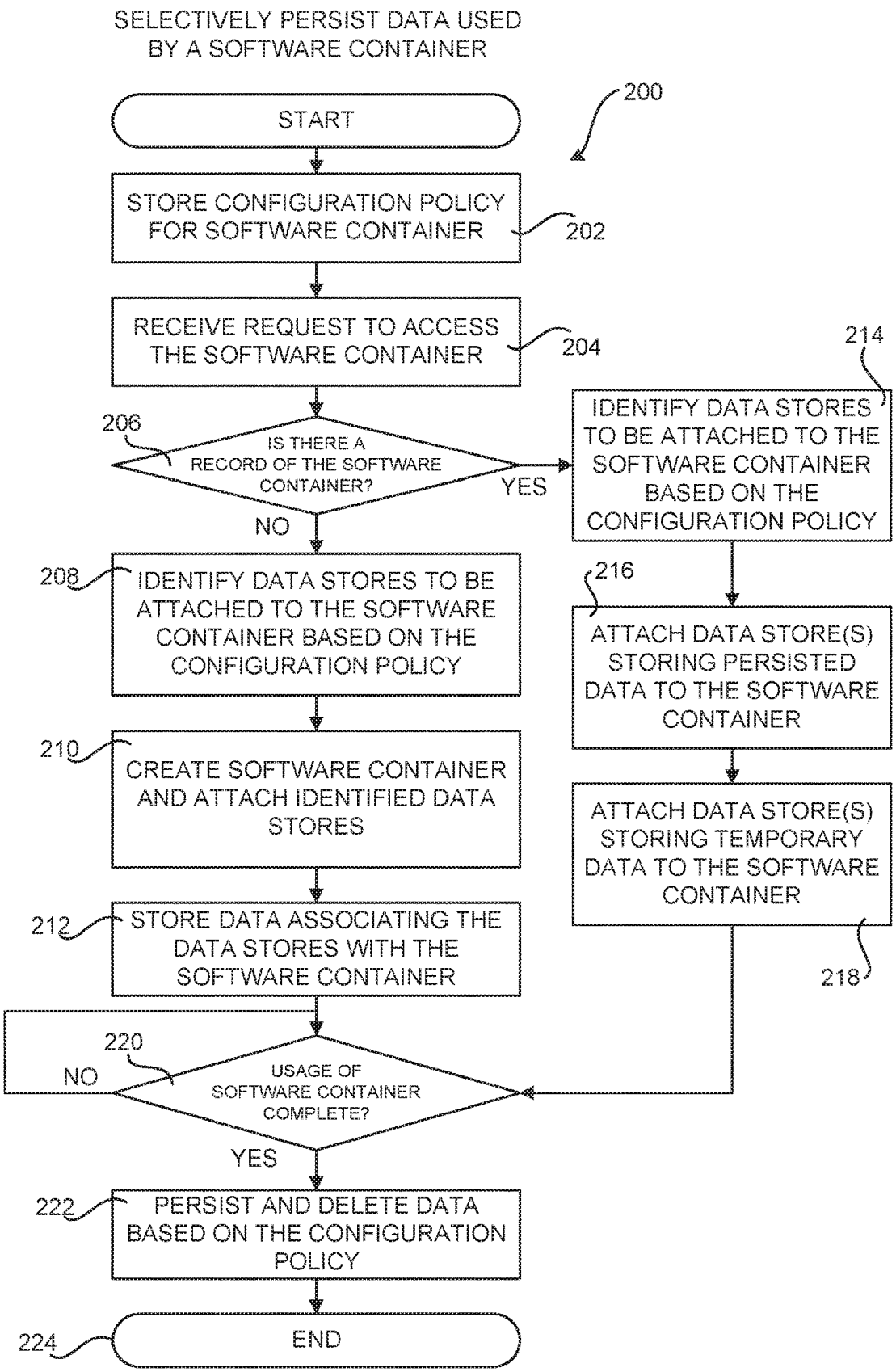
FIG. 2, which is a flow diagram, shows a routine that illustrates aspects of the operation of the system shown in FIG. 1 for selective persistence of data utilized by software containers, according to one configuration disclosed herein.

FIG. 2, which is a flow diagram, shows a routine 200 that illustrates aspects of the operation of the system shown in FIG. 1 for selective persistence of data utilized by software containers 103, according to one configuration disclosed herein. It should be appreciated that the logical operations described herein with regard to FIG. 2, and the other FIGS., can be implemented (1) as a sequence of computer implemented acts or program modules running on a computing system and/or (2) as interconnected machine logic circuits or circuit modules within the computing system. The logical operations shown in the FIGS. can also be implemented across multiple computing systems forming a distributed computing system or network.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, across multiple computing systems as described above, and any combination thereof. It is to be appreciated that operations of the methods disclosed herein are not necessarily presented in any particular order, and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can end at any time and need not be performed in their entireties.

The operations of the method 200 are described herein as being implemented, at least in part, by system components, which can comprise an application 128, component and/or a circuit. In some configurations, the system components include a dynamically linked library ("DLL"), a statically linked library, functionality produced by an application programing interface ("API"), a compiled program, an interpreted program, a script or any other executable set of instructions. Data, such as user data, temporary files, system data, host policy data, and other data, can be stored in a data structure in one or more memory components. Data can be retrieved from the data structure by addressing links or references to the data structure.

Although the following discussion of FIG. 2 refers to the components of FIG. 1, it can be appreciated that the operations of the routine 200 may be also implemented in many other ways. For example, the routine 200 may be implemented, at least in part, by a processor of another remote computer or a local circuit. In addition, one or more of the operations of the routine 200 may alternatively or additionally be implemented, at least in part, by a chipset working alone or in conjunction with other software modules. Any service, circuit or application suitable for providing the techniques disclosed herein can be used in operations described herein.

The routine 200 begins at operation 202, where the configuration policy 140 for a software container 103 is defined and stored in the host policy store 118. Thereafter, at operation 204, a request is received to perform an access to the software container 103. The access might be, for example, a request to create a new instance of the software container 103. The request might also be a request to initiate a new user session with a previously instantiated container 103.

Responsive to receiving a request to perform an access of the container 103, the routine 200 proceeds from operation 204 to operation 206. At operation 206, a determination is made as to whether a record of the container 103 exists. Such a record can be created, for example, during a previous instantiation of the container 103 or during a previous user session with the container 103.

If there is a record of the container as determined at block 206, the routine 200 proceeds to operation 214, where the system 100 may identify the data stores to be attached to the container 103 based upon the configuration policy 140. The routine 200 then proceeds from operation 214 to operation 216, where the storage management service 116 attaches the data stores 120 for storing persisted data to the software container 103, such as through the mount points 132. From operation 216, the routine 200 proceeds to operation 218, where the storage management service 116 instantiates and attaches new data stores 120 for storing temporary data to the software container 103, such as through the mount points 132. The routine 200 then proceeds from operation 218 to operation 220, which is described below.

If there is no record of the container as determined at block 206, the routine 200 proceeds from operation 206 to operation 208, where the storage management service 116 identifies the data stores 120 to be attached to the software container 103 based upon the configuration policy 140. The routine 200 then proceeds from operation 208 to operation 210, where the container management service 114 instantiates the new container 103 and the storage management service 116 attaches the data stores 120 to the container 103, such as through the mount points 132.

From operation 210, the routine 200 proceeds to operation 212, where the storage management service 116 stores data associating the attached data stores 120 with the software container 103. As discussed above, data uniquely identifying the software container 103 can be stored in the data stores 120. Additionally, the configuration policy 140 can also include data that defines an association between the software container 103 and the data uniquely identifying the software container 103 that is stored in the data stores 120. This data can be utilized to identify the data stores 120 that are to be attached to software containers, such as data stores 120 storing previously persisted data.

It is noted that after creation, the container 103 will be the runtime for the applications 128 and data be written to the allocated data stores 120. At some point in time, usage of the software container 103 will be complete, and the host 102 will destroy the container 103 or end the current user session with the container without destroying the container 103. This may be due to a triggered event such as a user log off, a reboot, due to the host 102 and/or container 103 receiving a software update, patch or upgrade, due to a newer version of the container 103 or software application 128 becoming available, or another factor.

Once usage of the software container 103 has completed, the host 102 will stop the container 103 runtime, and check the host policy store 118 for the container policy 140. Based on the container policy 140, for example, the host 102 will delete the data stored in the data stores 120 designated as storing temporary data (e.g. the data store 120A in FIG. 1). Data stored in the data stores 120 designated as storing data that is to be persisted (e.g. the data stores 120B and 120C in FIG. 1) will be persisted (i.e. will not be deleted following the expiration of the container lifetime). This occurs at operation 222. The routine 200 then proceeds from operation 222 to operation 224, where it ends.

At the time of the next access to the container 103 (e.g. creation of a new instance of the container 103 or the start of a new user session with the container 103), the container management service 114 and the storage management service 116 will create a new data store for storing non-persisted data. The container 103 will then be restarted or instantiated with the data store 120 storing non-persisted data and the previously persisted data stores for storing persisted data mounted to the container filesystem 130.

In this new instance of the container 103, the previously persisted data (e.g. user data and system data) persist even though the earlier instance of the container 103 was destroyed. In other embodiments, for example, persisted system data may be stored in a different location for auditing purposes, and each container 103 will receive a new instance of system data. Other embodiments may have classifications of storage mounted to the container filesystem 130 with different attributes. These storage instances may be mounted based on application installation, container location, security policy, storage need, user preferences, time of day or other events.

Figure 3:
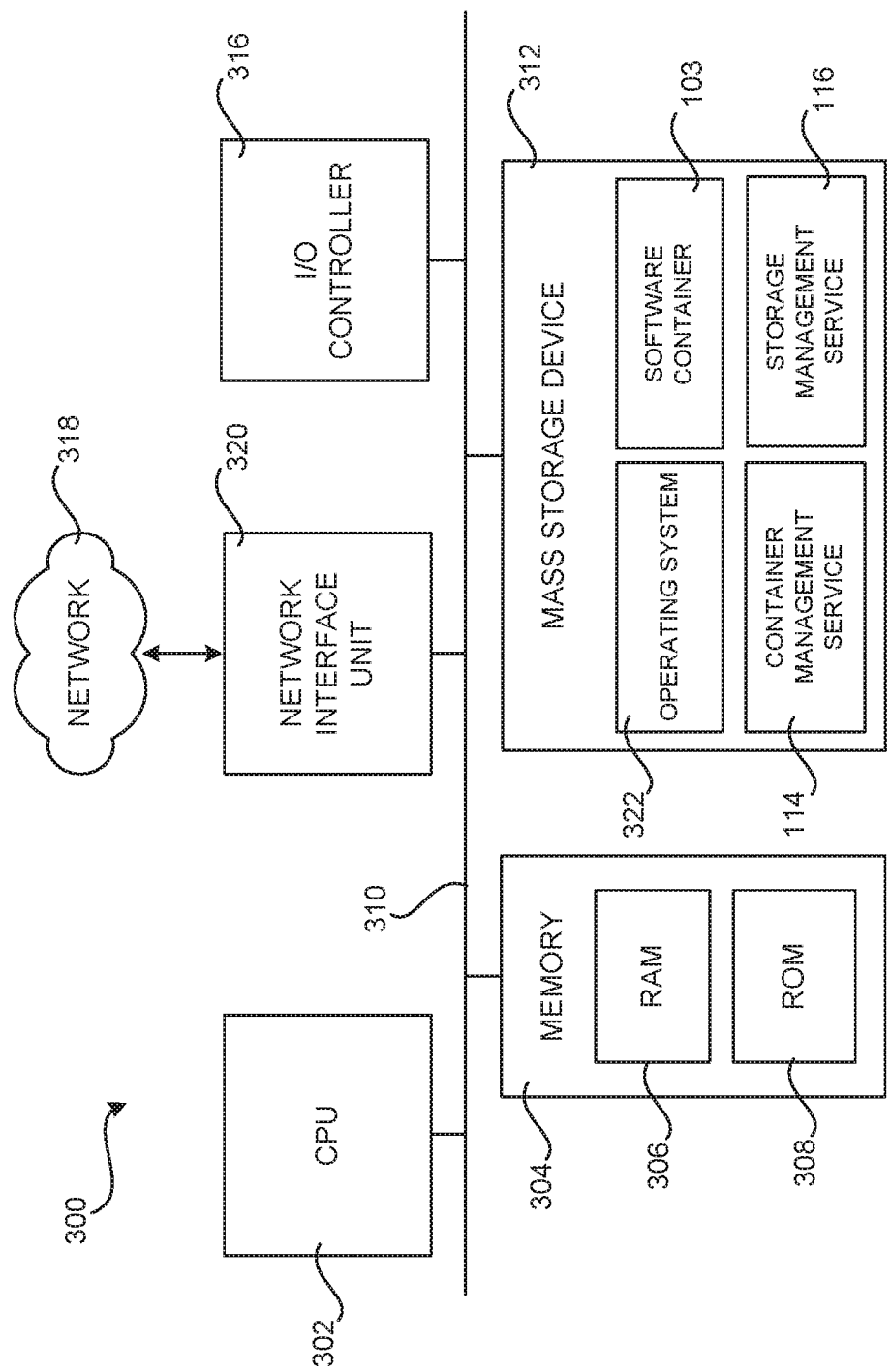
FIG. 3, which is a computer architecture diagram, shows an illustrative computer hardware and software architecture for a computing device, such as the computing devices shown in FIGS. 1 and 2, that is capable of implementing aspects of the technologies presented herein.

FIG. 3 is a computer architecture diagram that shows an architecture for a computer 300 capable of executing the software components described herein. The architecture illustrated in FIG. 3 is an architecture for a server computer, mobile phone, an e-reader, a smart phone, a desktop computer, a netbook computer, a tablet computer, a laptop computer, or another type of computing device suitable for executing the software components presented herein.

In this regard, it should be appreciated that the computer 300 shown in FIG. 3 can be utilized to implement a computing device capable of executing any of the software components presented herein. For example, and without limitation, the computing architecture described with reference to FIG. 3 can be utilized to implement the host computing device 102 illustrated in FIG. 1 and described above, which is capable of executing the software container 103, the container management service 114, the storage management service 116, and/or any of the other software components described above.

The computer 300 illustrated in FIG. 3 includes a central processing unit 302 ("CPU"), a system memory 304, including a random-access memory 306 ("RAM") and a read-only memory ("ROM") 308, and a system bus 310 that couples the memory 304 to the CPU 302. A basic input/output system ("BIOS" or "firmware") containing the basic routines that help to transfer information between elements within the computer 300, such as during startup, is stored in the ROM 308. The computer 300 further includes a mass storage device 312 for storing an operating system 322 and one or more programs including, but not limited to, the software container 103, the container management service 114, and the storage management service 116. The mass storage device 312 can also be configured to store other types of programs and data.

The mass storage device 312 is connected to the CPU 302 through a mass storage controller (not shown) connected to the bus 310. The mass storage device 312 and its associated computer readable media provide non-volatile storage for the computer 300. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 300. For purposes of the claims, the phrase "computer storage medium," and variations thereof, does not include waves or signals per se or communication media.

According to various configurations, the computer 300 can operate in a networked environment using logical connections to remote computers through a network such as the network 318. The computer 300 can connect to the network 318 through a network interface unit 320 connected to the bus 310. It should be appreciated that the network interface unit 320 can also be utilized to connect to other types of networks and remote computer systems. The computer 300 can also include an input/output controller 316 for receiving and processing input from a number of other devices, including a keyboard, mouse, touch input, or electronic stylus (not shown in FIG. 3). Similarly, the input/output controller 316 can provide output to a display screen, a printer, or other type of output device (also not shown in FIG. 3).

It should be appreciated that the software components described herein, such as the software container 103, the container management service 114, and the storage management service 116, when loaded into the CPU 302 and executed, can transform the CPU 302 and the overall computer 300 from a general-purpose computing system into a special-purpose computing system customized to facilitate the functionality presented herein. The CPU 302 can be constructed from any number of transistors or other discrete circuit elements, which can individually or collectively assume any number of states. More specifically, the CPU 302 can operate as a finite-state machine, in response to executable instructions contained within the software modules disclosed herein. These computer-executable instructions can transform the CPU 302 by specifying how the CPU 302 transitions between states, thereby transforming the transistors or other discrete hardware elements constituting the CPU 302.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 300 in order to store and execute the software components presented herein. It also should be appreciated that the architecture shown in FIG. 3 for the computer 300, or a similar architecture, can be utilized to implement other types of computing devices, including hand-held computers, embedded computer systems, mobile devices such as smartphones and tablets, and other types of computing devices known to those skilled in the art. It is also contemplated that the computer 300 might not include all of the components shown in FIG. 3, can include other components that are not explicitly shown in FIG. 3, or can utilize an architecture completely different than that shown in FIG. 3.

Figure 4:
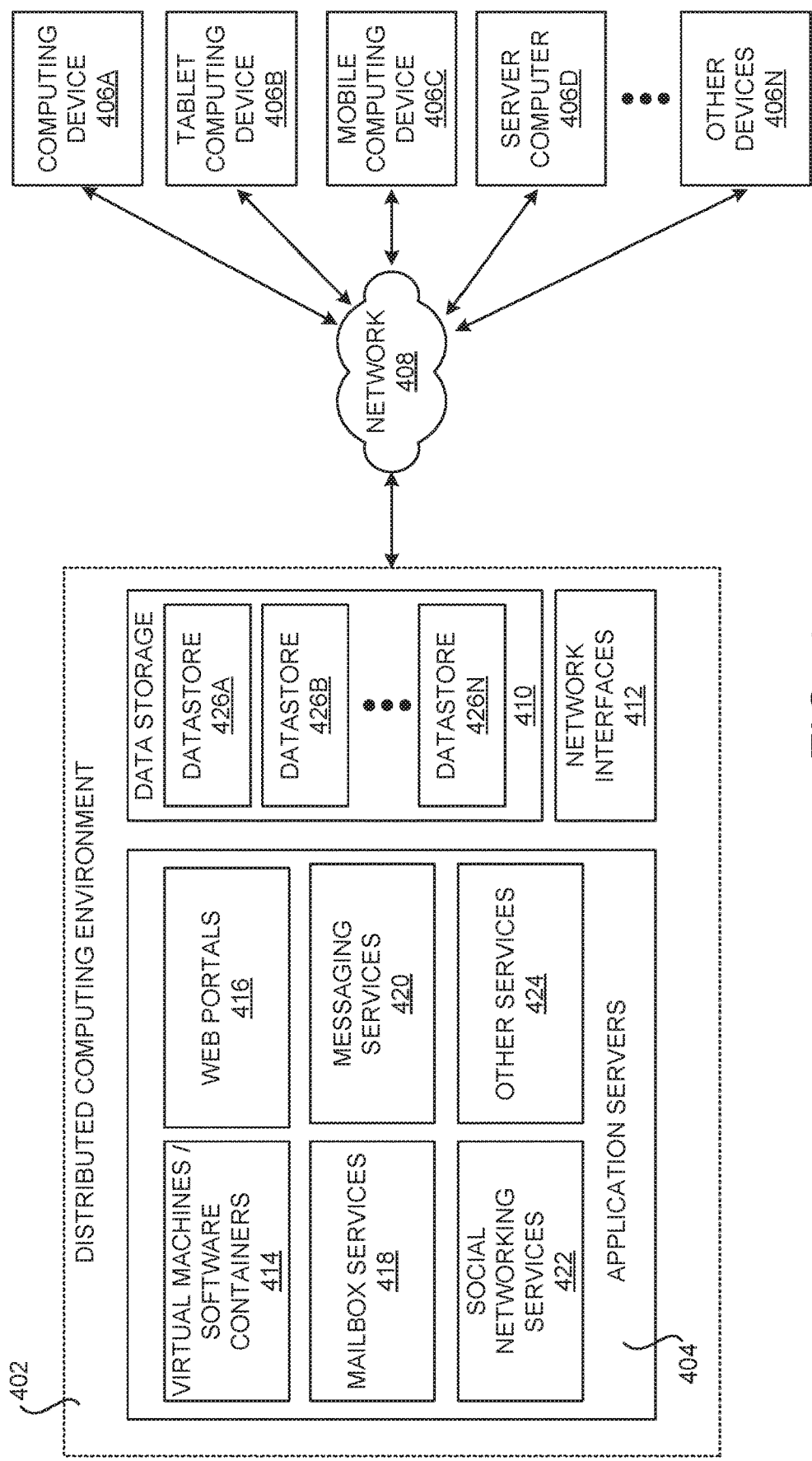
FIG. 4, which is a network diagram, illustrates a distributed computing environment capable of implementing aspects of the technologies presented herein.

FIG. 4 shows aspects of an illustrative distributed computing environment 402 in which the software components described herein can be executed. Thus, the distributed computing environment 402 illustrated in FIG. 4 can be used to execute program code, such as the software container 103, the container management service 114, and the storage management service 116, capable of providing the functionality described herein with respect to FIGS. 1 and 2, and/or any of the other software components described herein.

According to various implementations, the distributed computing environment 402 operates on, in communication with, or as part of a network 408. One or more client devices 406A-406N (hereinafter referred to collectively and/or generically as "devices 406") can communicate with the distributed computing environment 402 via the network 404 and/or other connections (not illustrated in FIG. 4).

In the illustrated configuration, the devices 406 include: a computing device 406A such as a laptop computer, a desktop computer, or other computing device; a "slate" or tablet computing device ("tablet computing device") 406B; a mobile computing device 406C such as a mobile telephone, a smart phone, or other mobile computing device; a server computer 406D; and/or other devices 406N. It should be understood that any number of devices 406 can communicate with the distributed computing environment 402. Two example computing architectures for the devices 406 are illustrated and described herein with reference to FIGS. 3 and 5. It should be understood that the illustrated clients 406 and computing architectures illustrated and described herein are illustrative, and should not be construed as being limited in any way.

In the illustrated configuration, the distributed computing environment 402 includes application servers 404, data storage 410, and one or more network interfaces 412.

According to various implementations, the functionality of the application servers 404 can be provided by one or more server computers that are executing as part of, or in communication with, the network 408. The application servers 404 can host various services such as virtual machines, portals, and/or other resources. In the illustrated configuration, the application servers 404 host one or more virtual machines or software containers 414 for providing aspects of the functionality disclosed herein. It should be understood that this configuration is illustrative, and should not be construed as being limiting in any way. The application servers 404 might also host or provide access to one or more web portals, link pages, websites, and/or other information ("web portals") 416.

According to various implementations, the application servers 404 also include one or more mailbox services 418 and one or more messaging services 420. The mailbox services 418 can include electronic mail ("email") services. The mailbox services 418 can also include various personal information management ("PIM") services including, but not limited to, calendar services, contact management services, collaboration services, and/or other services. The messaging services 420 can include, but are not limited to, instant messaging ("IM") services, chat services, forum services, and/or other communication services.

The application servers 404 can also include one or more social networking services 422. The social networking services 422 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 422 are provided by or include the FACEBOOK social networking service, the LINKEDIN professional networking service, the FOURSQUARE geographic networking service, and the like. In other configurations, the social networking services 422 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 422 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 422 are not mentioned herein for the sake of brevity. As such, the configurations described above are illustrative, and should not be construed as being limited in any way.

As also shown in FIG. 4, the application servers 404 can also host other services, applications, portals, and/or other resources ("other services") 424. These services can include, but are not limited to, streaming video services like the NETFLIX streaming video service and productivity services such as the GMAIL email service from GOOGLE INC. It thus can be appreciated that activities performed by users of the distributed computing environment 402 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 402 can include data storage 410. According to various implementations, the functionality of the data storage 410 is provided by one or more databases operating on, or in communication with, the network 408. The functionality of the data storage 410 can also be provided by one or more server computers configured to host data for the distributed computing environment 402. The data storage 410 can include, host, or provide one or more real or virtual datastores 426A-426N (hereinafter referred to collectively and/or generically as "datastores 426"). The datastores 426 are configured to host data used or created by the application servers 404 and/or other data.

The distributed computing environment 402 can communicate with, or be accessed by, the network interfaces 412. The network interfaces 412 can include various types of network hardware and software for supporting communications between two or more computing devices including, but not limited to, the devices 406 and the application servers 404. It should be appreciated that the network interfaces 412 can also be utilized to connect to other types of networks and/or computer systems.

It should be understood that the distributed computing environment 402 described herein can implement any aspects of the software elements described herein with any number of virtual computing resources and/or other distributed computing functionality that can be configured to execute any aspects of the software components disclosed herein. It should be understood that the devices 406 can also include real or virtual machines including, but not limited to, server computers, web servers, personal computers, mobile computing devices, smart phones, and/or other devices. As such, various implementations of the technologies disclosed herein enable any device configured to access the distributed computing environment 402 to utilize the functionality described herein.

Figure 5:
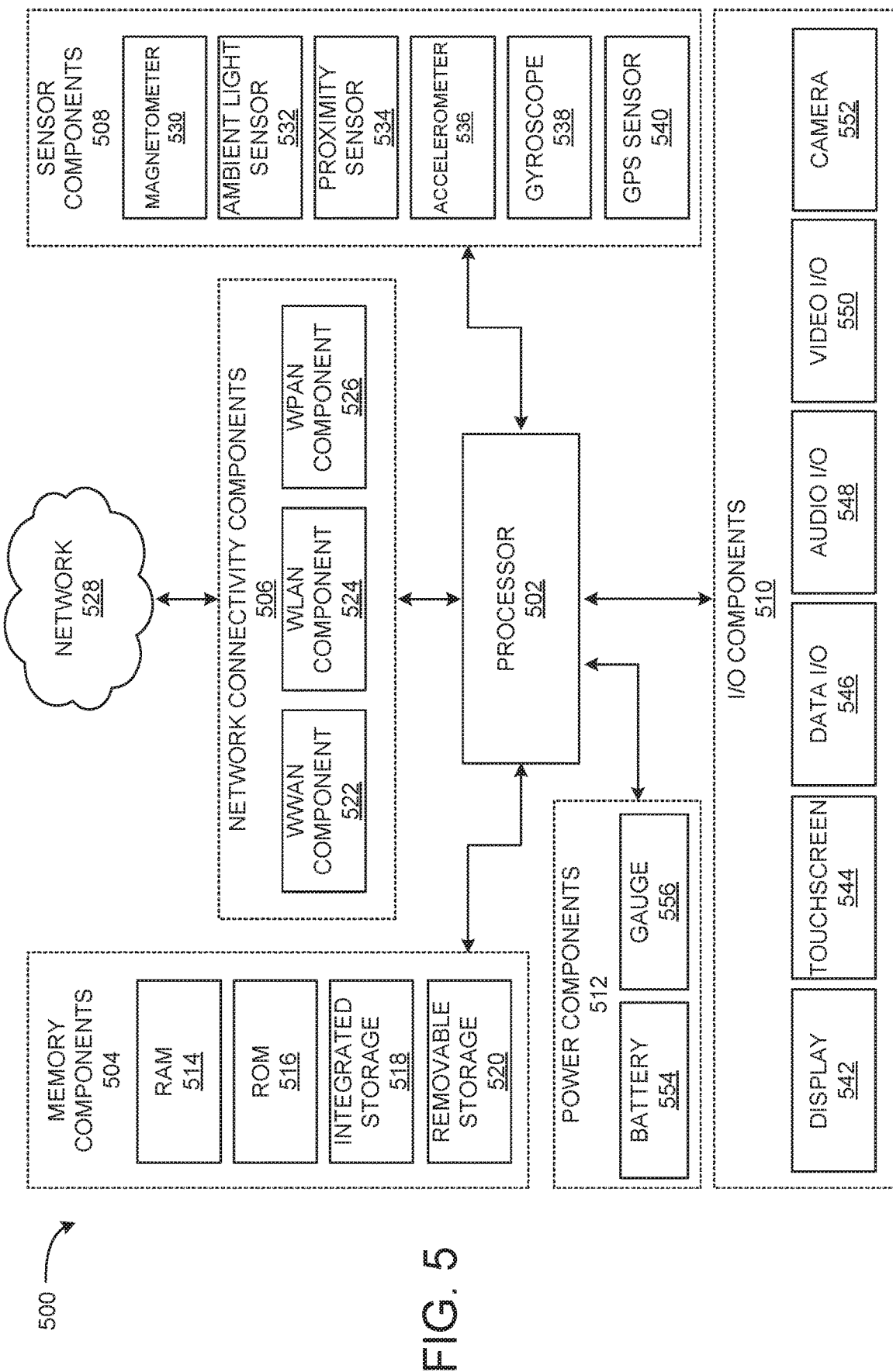
FIG. 5, which is a computer architecture diagram, illustrates a computing device architecture for a computing device, such as the computing devices shown in FIGS. 1 and 2, that can implement aspects of the technologies presented herein.

Turning now to FIG. 5, an illustrative computing device architecture 500 will be described for a computing device, such as the computing devices 102, that is capable of executing the various software components described herein. The computing device architecture 500 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 500 is also applicable to any of the devices 406 shown in FIG. 4. Furthermore, aspects of the computing device architecture 500 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, or tablet computer devices that utilize a touchscreen or some other touch-enabled device, such as a touch-enabled track pad or touch-enabled mouse. The computing device architecture 500 can also be utilized to implement the host computing device 102, and/or other types of computing devices for implementing or consuming the functionality described herein.

The computing device architecture 500 illustrated in FIG. 5 includes a processor 502, memory components 504, network connectivity components 506, sensor components 508, input/output components 510, and power components 512. In the illustrated configuration, the processor 502 is in communication with the memory components 504, the network connectivity components 506, the sensor components 508, the input/output ("I/O") components 510, and the power components 512. Although no connections are shown between the individual components illustrated in FIG. 5, the components can be connected electrically in order to interact and carry out device functions. In some configurations, the components are arranged so as to communicate via one or more busses (not shown).

The processor 502 includes one or more CPU cores configured to process data, execute computer-executable instructions of one or more application programs and to communicate with other components of the computing device architecture 500 in order to perform various functionality described herein. The processor 502 can be utilized to execute aspects of the software components presented herein and, particularly, those that utilize, at least in part, a touch-enabled input.

In some configurations, the processor 502 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 502 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 502 is, or is included in, a system-on-chip ("SoC") along with one or more of the other components described herein below. For example, the SoC can include the processor 502, a GPU, one or more of the network connectivity components 506, and one or more of the sensor components 508. In some configurations, the processor 502 is fabricated, in part, utilizing a package-on-package ("PoP") integrated circuit packaging technique. Moreover, the processor 502 can be a single core or multi-core processor.

The processor 502 can be created in accordance with an ARM architecture, available for license from ARM HOLDINGS of Cambridge, United Kingdom. Alternatively, the processor 502 can be created in accordance with an x86 architecture, such as is available from INTEL CORPORATION of Mountain View, Calif. and others. In some configurations, the processor 502 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 504 include a RAM 514, a ROM 516, an integrated storage memory ("integrated storage") 518, and a removable storage memory ("removable storage") 520. In some configurations, the RAM 514 or a portion thereof, the ROM 516 or a portion thereof, and/or some combination of the RAM 514 and the ROM 516 is integrated in the processor 502. In some configurations, the ROM 516 is configured to store a firmware, an operating system or a portion thereof (e.g., operating system kernel), and/or a bootloader to load an operating system kernel from the integrated storage 518 or the removable storage 520.

The integrated storage 518 can include a solid-state memory, a hard disk, or a combination of solid-state memory and a hard disk. The integrated storage 518 can be soldered or otherwise connected to a logic board upon which the processor 502 and other components described herein might also be connected. As such, the integrated storage 518 is integrated in the computing device. The integrated storage 518 can be configured to store an operating system or portions thereof, application programs, data, and other software components described herein.

The removable storage 520 can include a solid-state memory, a hard disk, or a combination of solid-state memory and a hard disk. In some configurations, the removable storage 520 is provided in lieu of the integrated storage 518. In other configurations, the removable storage 520 is provided as additional optional storage. In some configurations, the removable storage 520 is logically combined with the integrated storage 518 such that the total available storage is made available and shown to a user as a total combined capacity of the integrated storage 518 and the removable storage 520.

The removable storage 520 is configured to be inserted into a removable storage memory slot (not shown) or other mechanism by which the removable storage 520 is inserted and secured to facilitate a connection over which the removable storage 520 can communicate with other components of the computing device, such as the processor 502. The removable storage 520 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 504 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 506 include a wireless wide area network component ("WWAN component") 522, a wireless local area network component ("WLAN component") 524, and a wireless personal area network component ("WPAN component") 526. The network connectivity components 506 facilitate communications to and from a network 528, which can be a WWAN, a WLAN, or a WPAN. Although a single network 528 is illustrated, the network connectivity components 506 can facilitate simultaneous communication with multiple networks. For example, the network connectivity components 506 can facilitate simultaneous communications with multiple networks via one or more of a WWAN, a WLAN, or a WPAN.

The network 528 can be a WWAN, such as a mobile telecommunications network utilizing one or more mobile telecommunications technologies to provide voice and/or data services to a computing device utilizing the computing device architecture 500 via the WWAN component 522. The mobile telecommunications technologies can include, but are not limited to, Global System for Mobile communications ("GSM"), Code Division Multiple Access ("CDMA")

ONE, CDMA2000, Universal Mobile Telecommunications System ("UMTS"), Long Term Evolution ("LTE"), and Worldwide Interoperability for Microwave Access ("WiMAX").

Moreover, the network 528 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 528 can be configured to provide voice and/or data communications with any combination of the above technologies. The network 528 can be configured or adapted to provide voice and/or data communications in accordance with future generation technologies.

In some configurations, the WWAN component 522 is configured to provide dual-multi-mode connectivity to the network 528. For example, the WWAN component 522 can be configured to provide connectivity to the network 528, wherein the network 528 provides service via GSM and UMTS technologies, or via some other combination of technologies. Alternatively, multiple WWAN components 522 can be utilized to perform such functionality, and/or provide additional functionality to support other non-compatible technologies (i.e., incapable of being supported by a single WWAN component). The WWAN component 522 can facilitate similar connectivity to multiple networks (e.g., a UMTS network and an LTE network).

The network 528 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 524 is configured to connect to the network 528 via the WI-FI access points. Such connections can be secured via various encryption technologies including, but not limited, WI-FI Protected Access ("WPA"), WPA2, Wired Equivalent Privacy ("WEP"), and the like.

The network 528 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 526 is configured to facilitate communications with other devices, such as peripherals, computers, or other computing devices via the WPAN.

The sensor components 508 include a magnetometer 530, an ambient light sensor 532, a proximity sensor 534, an accelerometer 536, a gyroscope 538, and a Global Positioning System sensor ("GPS sensor") 540. It is contemplated that other sensors, such as, but not limited to, temperature sensors or shock detection sensors, might also be incorporated in the computing device architecture 500.

The magnetometer 530 is configured to measure the strength and direction of a magnetic field. In some configurations, the magnetometer 530 provides measurements to a compass application program stored within one of the memory components 504 in order to provide a user with accurate directions in a frame of reference including the cardinal directions, north, south, east, and west. Similar measurements can be provided to a navigation application program that includes a compass component. Other uses of measurements obtained by the magnetometer 530 are contemplated.

The ambient light sensor 532 is configured to measure ambient light. In some configurations, the ambient light sensor 532 provides measurements to an application program stored within one the memory components 504 in order to automatically adjust the brightness of a display (described below) to compensate for low light and bright light environments. Other uses of measurements obtained by the ambient light sensor 532 are contemplated.

The proximity sensor 534 is configured to detect the presence of an object or thing in proximity to the computing device without direct contact. In some configurations, the proximity sensor 534 detects the presence of a user's body (e.g., the user's face) and provides this information to an application program stored within one of the memory components 504 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 534 are contemplated.

The accelerometer 536 is configured to measure proper acceleration. In some configurations, output from the accelerometer 536 is used by an application program as an input mechanism to control some functionality of the application program. In some configurations, output from the accelerometer 536 is provided to an application program for use in switching between landscape and portrait modes, calculating coordinate acceleration, or detecting a fall. Other uses of the accelerometer 536 are contemplated.

The gyroscope 538 is configured to measure and maintain orientation. In some configurations, output from the gyroscope 538 is used by an application program as an input mechanism to control some functionality of the application program. For example, the gyroscope 538 can be used for accurate recognition of movement within a 3D environment of a video game application or some other application. In some configurations, an application program utilizes output from the gyroscope 538 and the accelerometer 536 to enhance control of some functionality of the group conversation application client 102. Other uses of the gyroscope 538 are contemplated.

The GPS sensor 540 is configured to receive signals from GPS satellites for use in calculating a location. The location calculated by the GPS sensor 540 can be used by any application program that requires or benefits from location information. For example, the location calculated by the GPS sensor 540 can be used with a navigation application program to provide directions from the location to a destination or directions from the destination to the location. Moreover, the GPS sensor 540 can be used to provide location information to an external location-based service, such as E911 service. The GPS sensor 540 can obtain location information generated via WI-FI, WIMAX, and/or cellular triangulation techniques utilizing one or more of the network connectivity components 506 to aid the GPS sensor 540 in obtaining a location fix. The GPS sensor 540 can also be used in Assisted GPS ("A-GPS") systems.

The I/O components 510 include a display 542, a touchscreen 544, a data I/O interface component ("data I/O") 546, an audio I/O interface component ("audio I/O") 548, a video I/O interface component ("video I/O") 550, and a camera 552. In some configurations, the display 542 and the touchscreen 544 are combined. In some configurations two or more of the data I/O component 546, the audio I/O component 548, and the video I/O component 550 are combined. The I/O components 510 can include discrete processors configured to support the various interfaces described below, or might include processing functionality built-in to the processor 502.

The display 542 is an output device configured to present information in a visual form. In particular, the display 542 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 542 is a liquid crystal display ("LCD") utilizing any active or passive matrix technology and any backlighting technology (if used). In some configurations, the display 542 is an organic light emitting diode ("OLED") display. Other display types are contemplated.

The touchscreen 544 is an input device configured to detect the presence and location of a touch. The touchscreen 544 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 544 is incorporated on top of the display 542 as a transparent layer to enable a user to use one or more touches to interact with objects or other information presented on the display 542. In other configurations, the touchscreen 544 is a touch pad incorporated on a surface of the computing device that does not include the display 542. For example, the computing device can have a touchscreen incorporated on top of the display 542 and a touch pad on a surface opposite the display 542.

In some configurations, the touchscreen 544 is a single-touch touchscreen. In other configurations, the touchscreen 544 is a multi-touch touchscreen. In some configurations, the touchscreen 544 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 544. As such, a developer can create gestures that are specific to a particular application program.

In some configurations, the touchscreen 544 supports a tap gesture in which a user taps the touchscreen 544 once on an item presented on the display 542. The tap gesture can be used for various reasons including, but not limited to, opening or launching whatever the user taps, such as a graphical icon representing the group conversation application client 102. In some configurations, the touchscreen 544 supports a double tap gesture in which a user taps the touchscreen 544 twice on an item presented on the display 542. The double tap gesture can be used for various reasons including, but not limited to, zooming in or zooming out in stages. In some configurations, the touchscreen 544 supports a tap and hold gesture in which a user taps the touchscreen 544 and maintains contact for at least a pre-defined time. The tap and hold gesture can be used for various reasons including, but not limited to, opening a context-specific menu.

In some configurations, the touchscreen 544 supports a pan gesture in which a user places a finger on the touchscreen 544 and maintains contact with the touchscreen 544 while moving the finger on the touchscreen 544. The pan gesture can be used for various reasons including, but not limited to, moving through screens, images, or menus at a controlled rate. Multiple finger pan gestures are also contemplated. In some configurations, the touchscreen 544 supports a flick gesture in which a user swipes a finger in the direction the user wants the screen to move. The flick gesture can be used for various reasons including, but not limited to, scrolling horizontally or vertically through menus or pages. In some configurations, the touchscreen 544 supports a pinch and stretch gesture in which a user makes a pinching motion with two fingers (e.g., thumb and forefinger) on the touchscreen 544 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 544. As such, the above gestures should be understood as being illustrative and should not be construed as being limiting in any way.

The data I/O interface component 546 is configured to facilitate input of data to the computing device and output of data from the computing device. In some configurations, the data I/O interface component 546 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 548 is configured to provide audio input and/or output capabilities to the computing device. In some configurations, the audio I/O interface component 548 includes a microphone configured to collect audio signals. In some configurations, the audio I/O interface component 548 includes a headphone jack configured to provide connectivity for headphones or other external speakers. In some configurations, the audio interface component 548 includes a speaker for the output of audio signals. In some configurations, the audio I/O interface component 548 includes an optical audio cable out.

The video I/O interface component 550 is configured to provide video input and/or output capabilities to the computing device. In some configurations, the video I/O interface component 550 includes a video connector configured to receive video as input from another device (e.g., a video media player such as a DVD or BLU-RAY player) or send video as output to another device (e.g., a monitor, a television, or some other external display). In some configurations, the video I/O interface component 550 includes a High-Definition Multimedia Interface ("HDMI"), mini-HDMI, micro-HDMI, DisplayPort, or proprietary connector to input/output video content. In some configurations, the video I/O interface component 550 or portions thereof is combined with the audio I/O interface component 548 or portions thereof.

The camera 552 can be configured to capture still images and/or video. The camera 552 can utilize a charge coupled device ("CCD") or a complementary metal oxide semiconductor ("CMOS") image sensor to capture images. In some configurations, the camera 552 includes a flash to aid in taking pictures in low-light environments. Settings for the camera 552 can be implemented as hardware or software buttons.

Although not illustrated, one or more hardware buttons can also be included in the computing device architecture 500. The hardware buttons can be used for controlling some operational aspect of the computing device. The hardware buttons can be dedicated buttons or multi-use buttons. The hardware buttons can be mechanical or sensor-based.

The illustrated power components 512 include one or more batteries 554, which can be connected to a battery gauge 556. The batteries 554 can be rechargeable or disposable. Rechargeable battery types include, but are not limited to, lithium polymer, lithium ion, nickel cadmium, and nickel metal hydride. Each of the batteries 554 can be made of one or more cells.

The battery gauge 556 can be configured to measure battery parameters such as current, voltage, and temperature. In some configurations, the battery gauge 556 is configured to measure the effect of a battery's discharge rate, temperature, age and other factors to predict remaining life within a certain percentage of error. In some configurations, the battery gauge 556 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 512 can also include a power connector (not shown), which can be combined with one or more of the aforementioned I/O components 510. The power components 512 can interface with an external power system or charging equipment via a power I/O component 510. Other configurations can also be utilized.

The disclosure presented herein also encompasses the subject matter set forth in the following clauses:

Clause 1. A computer-implemented method, comprising: storing a configuration policy for a software container, the configuration policy comprising data defining a first data store for storing first data for the software container that is not to be persisted following destruction of the software container and a second data store for storing second data for the software container that is to be persisted following destruction of the software container; responsive to a first access to the software container, identifying the first data store and the second data store based on the configuration policy, and attaching the first data store and the second data store to the software container; following the first access to the software container, deleting the first data stored in the first data store, and persisting the second data stored in the second data store; and responsive to a second access to the software container, identifying the first data store and the second data store, and attaching a second instance of the first data store and the second data store comprising the persisted second data to the software container.

Clause 2. The computer-implemented method of clause 1, wherein the configuration policy comprises further data defining a third data store for storing third data for the software container that is to be persisted following the first access to the software container, and wherein the method further comprises: responsive to the first access to the software container, identifying the third data store, and attaching the third data store to the software container; following the first access to the software container, persisting the third data stored in the third data store; and responsive to the second access to software container, identifying the third data store based on the configuration policy, and attaching the third data store comprising the persisted third data to the software container.

Clause 3. The computer-implemented method of clauses 1 or 2, wherein the second data comprises user data.

Clause 4. The computer implemented method of any of clauses 1-3, wherein the third data comprises system data.

Clause 5. The computer-implemented method of any of clauses 1-4, wherein the third data comprises data for a single application.

Clause 6. The computer-implemented method of any of clauses 1-5, wherein a single application defines the third data.

Clause 7. The computer-implemented method of any of clauses 1-6, wherein the first data store, the second data store, or the third data store comprise data uniquely identifying the software container Clause 8. A computing system, comprising:
one or more processors; and
at least one computer storage medium having computer executable instructions stored thereon which, when executed by the one or more processors, cause the apparatus to store a configuration policy for a software container executing on the one or more processors, the configuration policy comprising data defining a first data store for storing first data for the software container that is not to be persisted following destruction of the software container and a second data store for storing second data for the software container that is to be persisted following destruction of the software container; responsive to a first access to the software container, identify the first data store and the second data store based on the configuration policy, and attach the first data store and the second data store to the software container; following the first access to the software container, delete the first data stored in the first data store, and persisting the second data stored in the second data store; and responsive to a second access to the software container, identify the first data store and the second data store, and attach a second instance of the first data store and the second data store comprising the persisted second data to the software container.

Clause 9. The computing system of clause 8, wherein the configuration policy comprises further data defining a third data store for storing third data for the software container that is to be persisted following the first access to the software container, and wherein the at least one computer storage medium stores further computer executable instructions which, when executed by the one or more processors, identify the third data store and attach the third data store to the software container responsive to the first access to the software container, persist the third data stored in the third data store following the first access to the software container, and responsive to the second access to software container, identify the third data store based on the configuration policy, and attach the third data store comprising the persisted third data to the software container.

Clause 10. The computing system of clause 8 or 9, wherein the second data comprises user data.

Clause 11. The computing system of any of clauses 8-10, wherein the third data comprises system data.

Clause 12. The computing system of any of clauses 8-11, wherein the first data store, the second data store, or the third data store comprises a physical hard disk, a virtual hard disk, or a networked data store.

Clause 13. The computing system of any of clauses 8-12, wherein the first data store, the second data store, or the third data store comprise data uniquely identifying the software container.

Clause 14. The computing system of any of clauses 8-13, wherein an association between the software container and the software container is calculated based on one or more of available storage hardware, file system capabilities, or operating system versions.

Clause 15. At least one computer storage medium having computer executable instructions stored thereon which, when executed by one or more processors of a computing device cause the computing device to: store a configuration policy for a software container executing on the one or more processors, the configuration policy comprising data defining a first data store for storing first data for the software container that is not to be persisted following destruction of the software container and a second data store for storing second data for the software container that is to be persisted following destruction of the software container; responsive to a first access to the software container, identify the first data store and the second data store based on the configuration policy, and attach the first data store and the second data store to the software container; following the first access to the software container, delete the first data stored in the first data store, and persisting the second data stored in the second data store; and responsive to a second access to the software container, create the first data store and the second data store, and attach the first data store and the second data store comprising the persisted second data to the software container.

Clause 16. The at least one computer storage medium of clause 15, wherein the configuration policy comprises further data defining a third data store for storing third data for the software container that is to be persisted following the first access to the software container, and wherein the at least one computer storage medium stores further computer executable instructions which, when executed by the one or more processors, identify the third data store and attach the third data store to the software container responsive to the first access to the software container, persist the third data stored in the third data store following the first access to the software container, responsive to the second access to software container, identify the third data store based on the configuration policy, and attach the third data store comprising the persisted third data to the software container.

Clause 17. The at least one computer storage medium of clauses 15 or 16, wherein the second data comprises user data and wherein the third data comprises system data.

Clause 18. The at least one computer storage medium of any of clauses 15-17, wherein the first data store or the second data store comprise a physical hard disk, a virtual hard disk, or a networked data store.

Clause 19. The at least one computer storage medium of any of clauses 15-18, wherein the first data store and the second data store comprise data uniquely identifying the software container.

Clause 20. The at least one computer storage medium of any of clauses 15-19, wherein the configuration policy further comprises data specifying whether the first data store or the second data store is to be encrypted.

Based on the foregoing, it should be appreciated that various technologies for selective persistence of data utilized by software containers have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   storing a configuration policy for a software container, the configuration policy comprising data defining:
      a first data store for storing first data for the software container that is not to be persisted following destruction of the software container and
      a second data store for storing second data for the software container that is to be persisted following destruction of the software container;
   responsive to a first access to the software container:
      attaching the first data store and the second data store to the software container;
      receiving a request to store content from an application executing within the software container;
      determining if the content includes malicious content;
      selectively persisting the malicious content to the first data store, and
      selectively persisting non-malicious content to the second data store;
   responsive to the end of the first access to the software container:
      deleting the first data stored in the first data store and persisting the second data stored in the second data store; and
   responsive to a second access to the software container:
      attaching a second instance of the first data store to the software container and
      attaching the second data store comprising the persisted second data to the software container.

2. The computer-implemented method of claim 1, wherein the configuration policy comprises further data defining a third data store for storing third data for the software container that is to be persisted following the first access to the software container, and wherein the method further comprises:
   responsive to the first access to the software container, identifying the third data store, and attaching the third data store to the software container;
   following the first access to the software container, persisting the third data stored in the third data store; and
   responsive to the second access to software container, identifying the third data store based on the configuration policy, and attaching the third data store comprising the persisted third data to the software container.

3. The computer implemented method of claim 2, wherein the third data comprises system data.

4. The computer-implemented method of claim 2, wherein the third data comprises data generated by a single application.

5. The computer-implemented method of claim 1, wherein the second data comprises user data.

6. The computer-implemented method of claim 1, wherein multiple applications define the third data.

7. The computer-implemented method of claim 1, wherein the first data store, the second data store, or the third data store comprise data uniquely identifying the software container.

8. A computing system, comprising:
one or more processors; and
at least one computer storage medium having computer executable instructions stored thereon which, when executed by the one or more processors, cause the apparatus to
store a configuration policy for a software container executing on the one or more processors, the configuration policy comprising data defining
a first data store for storing first data for the software container that is not to be persisted following destruction of the software container and
a second data store for storing second data for the software container that is to be persisted following destruction of the software container;
responsive to a first access to the software container:
attach the first data store and the second data store to the software container;
receive a request to store content from an application executing within the software container;
determine if the content includes malicious content;
selectively persist the malicious content to the first data store, and
selectively persist non-malicious content to the second data store;
responsive to the end of the first access to the software container:
delete the first data stored in the first data store and
persist the second data stored in the second data store; and
responsive to a second access to the software container:
attach a second instance of the first data store to the software container and
attach the second data store comprising the persisted second data to the software container.

9. The computing system of claim 8, wherein the configuration policy comprises further data defining a third data store for storing third data for the software container that is to be persisted following the first access to the software container, and wherein the at least one computer storage medium stores further computer executable instructions which, when executed by the one or more processors,
identify the third data store and attach the third data store to the software container responsive to the first access to the software container,
persist the third data stored in the third data store following the first access to the software container, and
responsive to the second access to software container, identify the third data store based on the configuration policy, and attach the third data store comprising the persisted third data to the software container.

10. The computing system of claim 9, wherein the third data comprises system data.

11. The computing system of claim 8, wherein the second data comprises user data.

12. The computing system of claim 8, wherein the first data store, the second data store, or the third data store comprises a physical hard disk, a virtual hard disk, or a networked data store.

13. The computing system of claim 8, wherein the first data store, the second data store, or the third data store comprise data uniquely identifying the software container.

14. The computing system of claim 8, wherein an association between the software container and the software container is calculated based on one or more of available storage hardware, file system capabilities, or operating system versions.

15. At least one non-transitory computer storage medium having computer executable instructions stored thereon which, when executed by one or more processors of a computing device cause the computing device to:
store a configuration policy for a software container executing on the one or more processors, the configuration policy comprising data defining
a first data store for storing first data for the software container that is not to be persisted following destruction of the software container and
a second data store for storing second data for the software container that is to be persisted following destruction of the software container;
responsive to a first access to the software container:
attach the first data store and the second data store to the software container;
receive a request to store content from an application executing within the software container;
determine if the content includes malicious content;
selectively persist the malicious content to the first data store, and
selectively persist non-malicious content to the second data store;
responsive to the end of the first access to the software container:
delete the first data stored in the first data store and
persist the second data stored in the second data store; and
responsive to a second access to the software container:
attach the first data store to the software container and
attach the second data store comprising the persisted second data to the software container.

16. The at least one non-transitory computer storage medium of claim 15, wherein the configuration policy comprises further data defining a third data store for storing third data for the software container that is to be persisted following the first access to the software container, and wherein the at least one computer storage medium stores further computer executable instructions which, when executed by the one or more processors,
identify the third data store and attach the third data store to the software container responsive to the first access to the software container,
persist the third data stored in the third data store following the first access to the software container,
responsive to the second access to software container, identify the third data store based on the configuration policy, and attach the third data store comprising the persisted third data to the software container.

17. The at least one non-transitory computer storage medium of claim 15, wherein the second data comprises user data and wherein the third data comprises system data.

18. The at least one non-transitory computer storage medium of claim 15, wherein the first data store or the second data store comprise a physical hard disk, a virtual hard disk, or a networked data store.

19. The at least one non-transitory computer storage medium of claim 15, wherein the first data store and the second data store comprise data uniquely identifying the software container.

20. The at least one non-transitory computer storage medium of claim 15, wherein the configuration policy further comprises data specifying whether the first data store or the second data store is to be encrypted.

* * * * *